US006772241B1

United States Patent
George et al.

(10) Patent No.: US 6,772,241 B1
(45) Date of Patent: Aug. 3, 2004

(54) SELECTIVE INTERRUPT DELIVERY TO MULTIPLE PROCESSORS HAVING INDEPENDENT OPERATING SYSTEMS

(75) Inventors: Varghese George, Folsom, CA (US); Edward Gamsaragan, Folsom, CA (US); Vladimir M. Pentkovski, Folsom, CA (US); Deep K. Buch, Folsom, CA (US); Paul Zagacki, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 443 days.

(21) Appl. No.: 09/676,463

(22) Filed: Sep. 29, 2000

(51) Int. Cl.[7] .................................................. G06F 5/00
(52) U.S. Cl. ......................... 710/36; 710/266; 710/303
(58) Field of Search ............................... 710/266, 303, 710/36, 304, 267; 713/310, 323; 703/22, 27; 709/221, 229, 227; 714/2, 10, 36

(56) References Cited

U.S. PATENT DOCUMENTS

| 4,679,166 A | 7/1987 | Berger et al. |
| 4,695,945 A | 9/1987 | Irwin |
| 5,282,272 A | 1/1994 | Guy et al. |
| 5,388,215 A * | 2/1995 | Baker et al. ................. 709/229 |
| 5,495,569 A * | 2/1996 | Kotzur ........................... 714/2 |
| 5,511,200 A | 4/1996 | Jayakumar |
| 5,619,705 A | 4/1997 | Karnik et al. |
| 5,857,090 A | 1/1999 | Davis et al. |

OTHER PUBLICATIONS

MultiProcessor Specification, Version 1.4, Intel Corporation, May 1997.

* cited by examiner

Primary Examiner—Khanh Dang
(74) Attorney, Agent, or Firm—Blakely, Sokoloff, Taylor & Zafman LLP

(57) ABSTRACT

A method of and apparatus for selective delivery of an interrupt to one of multiple processors having independent operating systems is described. The interrupts are generated from various platform devices in the computer system. Depending on the mode of operation of the system, a controller is configured to deliver interrupts to a co-processor when the host processor is off, without turning on the host processor. The interrupt may be delivered to the correct processor using either a bus-based message or a dedicated interrupt line.

4 Claims, 7 Drawing Sheets

SELECTIVE INTERRUPT DELIVERY TO MULTIPLE PROCESSORS HAVING INDEPENDENT OPERATING SYSTEMS

FIELD OF THE INVENTION

The present invention relates to the field of computer systems and, in particular, to the operation of computer systems having multiple independent processors.

BACKGROUND OF THE INVENTION

Computer systems typically include various platform devices (e.g., disk drive) that operate under the control of a central processing unit (CPU). During operation of the computer system, interrupts are generated by these platform devices and transmitted to the CPU in order to communicate with the CPU.

Over the last few years, there have been many advances in computer system technology. These advances have lead to the development of computer systems having multiple processors to support additional and/or enhanced computing features. FIG. 1 illustrates, for example, one type of computer system that uses a co-processor in conjunction with a host CPU to perform complex mathematical operations. In such systems, the processors are under the control of a single operating system (OS). The use of single operating system, however, may limit the flexibility of the computer system.

Other advances in computer system technology have led to the development of battery-powered portable computers (e.g., laptop or notebook style computers, hand-held computers, etc.) that are implemented with high-speed processors similar to those implemented in desktop computers. Some of these portable computers may also include multiple processors. In order to conserve power in these systems, one or more of the processors may be placed in a low power mode, referred to as a "sleep mode" or "Limited ON" mode, when not in active use.

One problem with such a system is that the co-processor is not independent of the host CPU and, thus, cannot operate when the system is asleep. Therefore, the co-processor in the computer system will not be able to access system resources when the host processor is shut-down. In addition, when an interrupt is transmitted by a platform device, the interrupt is received by all the processors in the system including those that are not currently running or intentionally sitting idle. Such a configuration may lead to inefficiencies in the computer system. For example, a system operating with host CPU turned off may respond by waking up the host CPU upon receipt of an interrupt and, thereby, undesirably increase the power consumption of the system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, numerous specific details are set forth such as examples of specific operating systems, components, machine readable medium, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

Thus, a machine readable medium includes any mechanism for storing or transmitting information in a form (e.g., software) readable by a machine (e.g., a computer). For example, a machine readable medium includes read only memory (ROM); random access memory (RAM); magnetic disk storage medium; optical storage medium; flash memory devices; electrical, optical, acoustical or other form of propagated signals (e.g., carrier waves, infrared signals, digital signals, etc.); etc.

The method and apparatus described herein may be implemented with a computer system having two processors, as illustrated by the accompanying figures. It should be noted, however, that the description of the method and apparatus in relation to a computer system having a host processor and a co-processor is only for illustrative purposes and is not meant to be limited only to a computer system having two processors. In an alternative embodiment, other numbers of processors may be used.

In one embodiment, the computer system may include a first processor coupled with a controller through a first bus and a second processor coupled with the controller through a second bus. The second processor (e.g., a co-processor) operates with an operating system independent from the operating system of the first processor (e.g., a host processor). The second processor is coupled with the controller through a bus different than that used to couple the first processor with the controller. The method of interrupt delivery may include receiving an interrupt request by either the first processor or the second processor based on the mode of operation of the computer system. The interrupt being received by the first processor uses a communications link different than the second processor.

Figure 1:
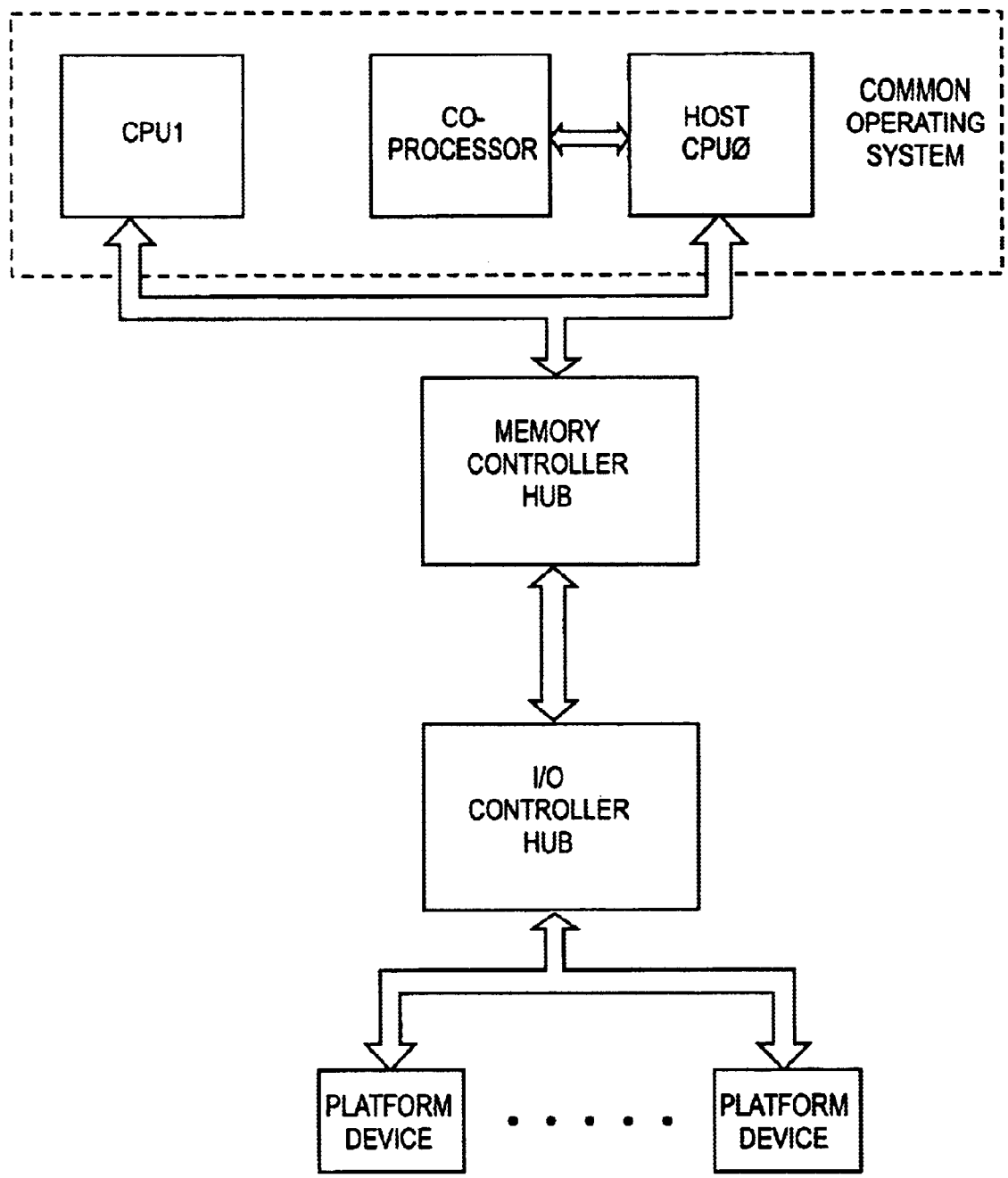
FIG. 1 illustrates a prior art computer system having multiple processors running a common operating system with a common communication bus.
Figure 2:
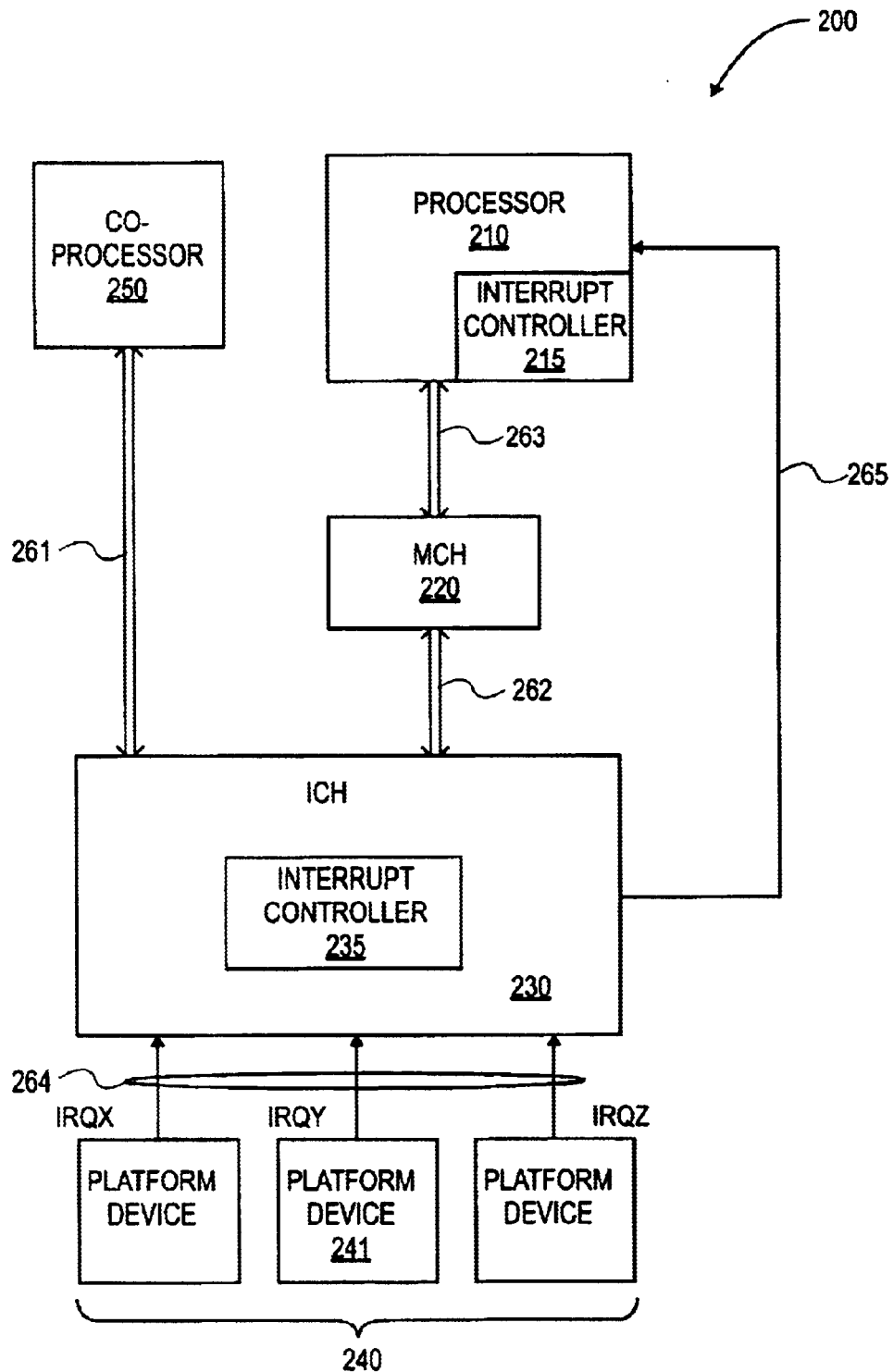
FIG. 2 illustrates one embodiment of a computer system having multiple processors running independent operating systems.

FIG. 2 illustrates one embodiment of a computer system having multiple processors running independent operating systems. Computer system 200 includes a processor 210, memory control hub (MCH) 220, an input/output control hub (ICH) 230, platform devices 240, co-processor 250, and buses 261–264. Buses 261–264 carry data and addresses to the various components in computer system 200.

The MCH 220 controls operations between processor 210 and memory devices (not shown), for examples, a graphics controller and a random access memory (RAM). The ICH 230 controls operations between processor 210 and platform devices 240. Platform devices 240 may be, for example, a disk drive and a universal serial bus (USB) device. In another embodiment, the MCH 220 and the ICH 230 may be integrated into a single component.

Computer system 200 requires at least a main operating system in order to function. The main operating system may be stored on one of the platform devices 240 of computer system 200. When computer system 200 boots (i.e., is started), a set of basic input/output start up (BIOS) routines stored in memory are executed by processor 210 of the system and subsequently loads the main operating system of computer system 200.

Computer system 200 also includes a co-processor 250. Co-processor 250 is coupled to ICH 230 using a separate bus 261 than the bus for processor 210, and co-processor 250 is configured to operate with an independent operating system from that of processor 210, referred to as a mini OS. The mini OS of co-processor 250 may be loaded at approximately the same time as the main OS for processor 210. In one embodiment, for example, the main OS may be a Microsoft Widows™ OS and the mini OS may be a real time operating system (RTOS) such as QNX available from QNX Software Systems Ltd. of Canada and Precise/MQX available from Precise Software Technologies Inc. of Canada. In an alternative embodiment, processors 210 and 250 may operate with other operating systems.

Computer system 200 may be configured to operate in various modes. In one embodiment, computer system 200 has three modes of operation: Full ON, Limited ON, and Listen. In Full ON mode, processor 210 and co-processor 250 are both on. In Limited ON mode, processor 210 is off and co-processor 250 is on and configured as the master device. In Listen mode, processor 210 is off and co-processor 250 is partially on and configured as the master device. During the transition from the Full ON mode to the Limited ON mode, either hardware or software may be used to configure ICH 230 into the appropriate mode.

In one embodiment, in the Full ON mode, processor 210 may function as a master device with co-processor configured as a slave device, such as a personal computer interface (PCI) device, in the system. A PCI device is well known in the art, accordingly, a detailed discussion is not provided.

During operation of computer system 200, interrupt requests (IRQ) may be generated from one or more of platform devices 240 (e.g., IRQX, IRQY, and IRQZ). The IRQ is delivered from platform devices 240 to ICH 230 on signal line 264. However, an interrupt may also be generated from co-processor 250 and delivered to ICH 230 on bus 261. Depending on the mode of operation of computer system 200 at the time of the interrupts, ICH 230 delivers interrupts to either co-processor 250 or processor 210 using interrupt controller 235.

Interrupt controller 235 serves as an interface between platform devices 240 and processors 210, 250 in handling interrupt requests. For example, platform device 241 may toggle an IRQ line to signal an interrupt. Interrupt controller 235 accepts the interrupt request from platform device 241 and issues an interrupt request to, for example, processor 210 on a communications link 265. In one embodiment, communications link 265 is a dedicated interrupt line. On receiving the interrupt request from interrupt controller 235, processor 210 initiates an acknowledgement command on the host bus 263 when it is ready. The interrupt acknowledgement command requests the identification of the platform device 241 that sent the IRQ. Interrupt controller 235 sends an interrupt vector to processor 210 on bus 263 that identifies the requesting platform device 241 and a corresponding routine in processor 210 to handle the interrupt pending on platform device 241.

In one embodiment, interrupt controller 235 is a programmable interrupt controller such as the 8259 from Intel Corporation of Santa Clara, Calif. The 8259 may be used to handle operating systems such as the Microsoft Windows 95 operating system. In alternative embodiments, other programmable interrupt controllers and operating systems may be used.

In one embodiment, ICH 230 includes a state machine that operates to recognize that there may be a more than one possible master processor in computer system 200 and redirect an interrupt request to either processor 210 or co-processor 250 based on the system state. For example, the state machine may direct all requests to processor 210 when computer system 200 is in the Full ON mode and to processor 250 when computer system 200 is in the Limited ON or Listen mode discussed above. As such, ICH 230 is aware of the current mode of operation in computer system 200. In one embodiment, software may be used to program ICH 230 to know the current operating mode of computer system 200. In an alternative embodiment, ICH 230 may be hardwired to detect the mode of computer system 200 based on a signal state.

Figure 7:
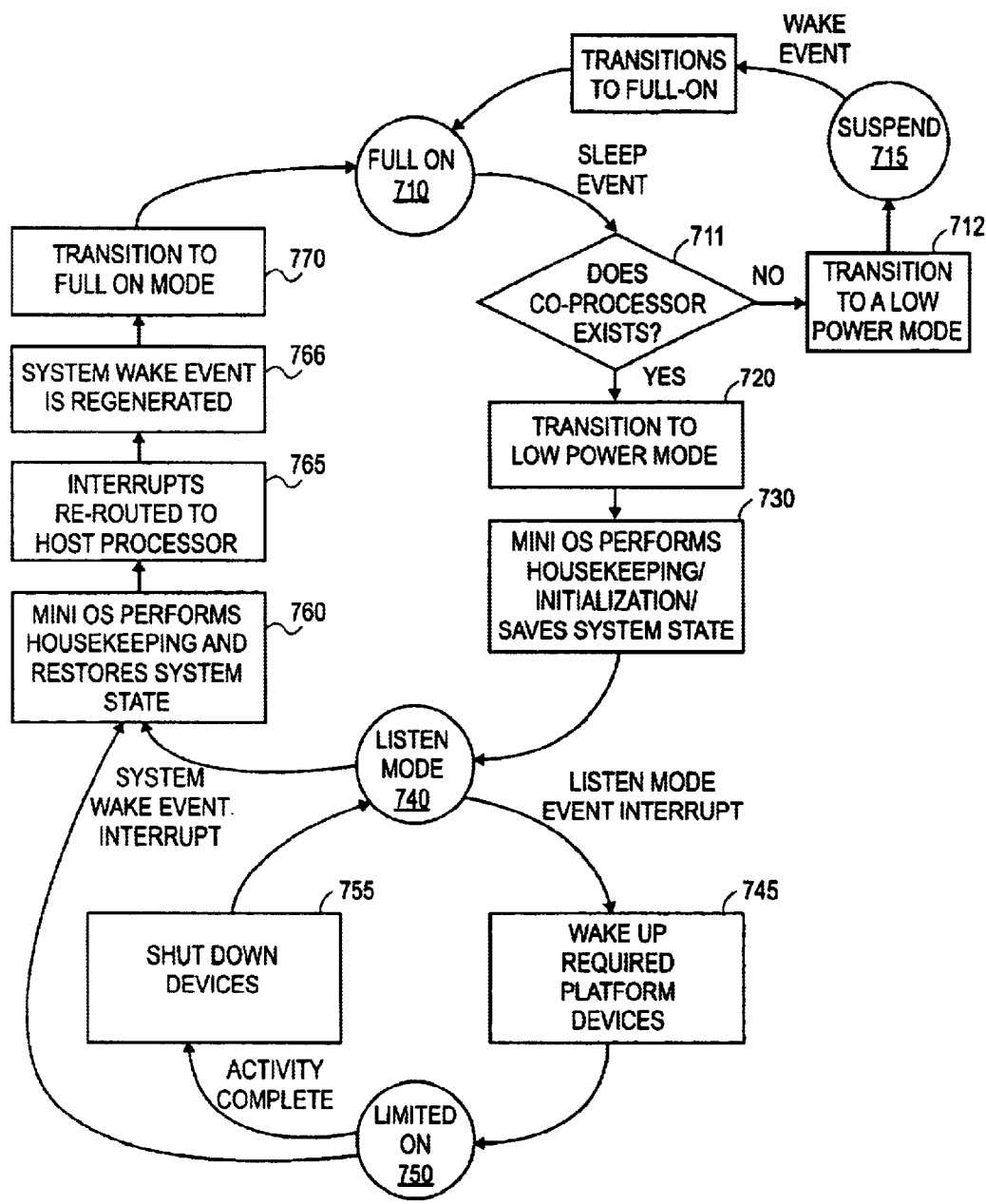
FIG. 7 is a state diagram illustrating one embodiment of the state machine of a controller.

FIG. 7 is a state diagram illustrating one embodiment of the state machine of ICH 230. In state 710, the computer system is in Full On mode. If a sleep event is detected, the computer system determines whether a co-processor exists, step 711. If a co-processor does not exist, the computer system transitions to a low power mode and enters suspend state 715. Upon the occurrence of a wake event, the computer system transitions to Full On state 710.

If a co-processor is determined to exist at step 711, the computer system performs a transition to a low power mode and notifies the co-processor's mini OS of the transition, step 720. The mini OS performs housekeeping activities and initializes and saves the system state, step 730. The computer system is now in listen mode, state 740, and the interrupts get routed to the co-processor. If an event interrupt is detected, the co-processor wakes up the required platform devices to perform the required activity, step 745. The system goes into Limited On mode, state 750. Once activity is complete, the computer system's resources are shut-down, step 755, and the computer system returns to state 740.

Upon a system wake event interrupt, the mini OS performs housekeeping and restores the system state, step 760. The interrupts then get re-routed to the host processor, step 765. The system wake event is regenerated, step 766, and the computer system transitions to Full On mode, step 770.

Figure 3:
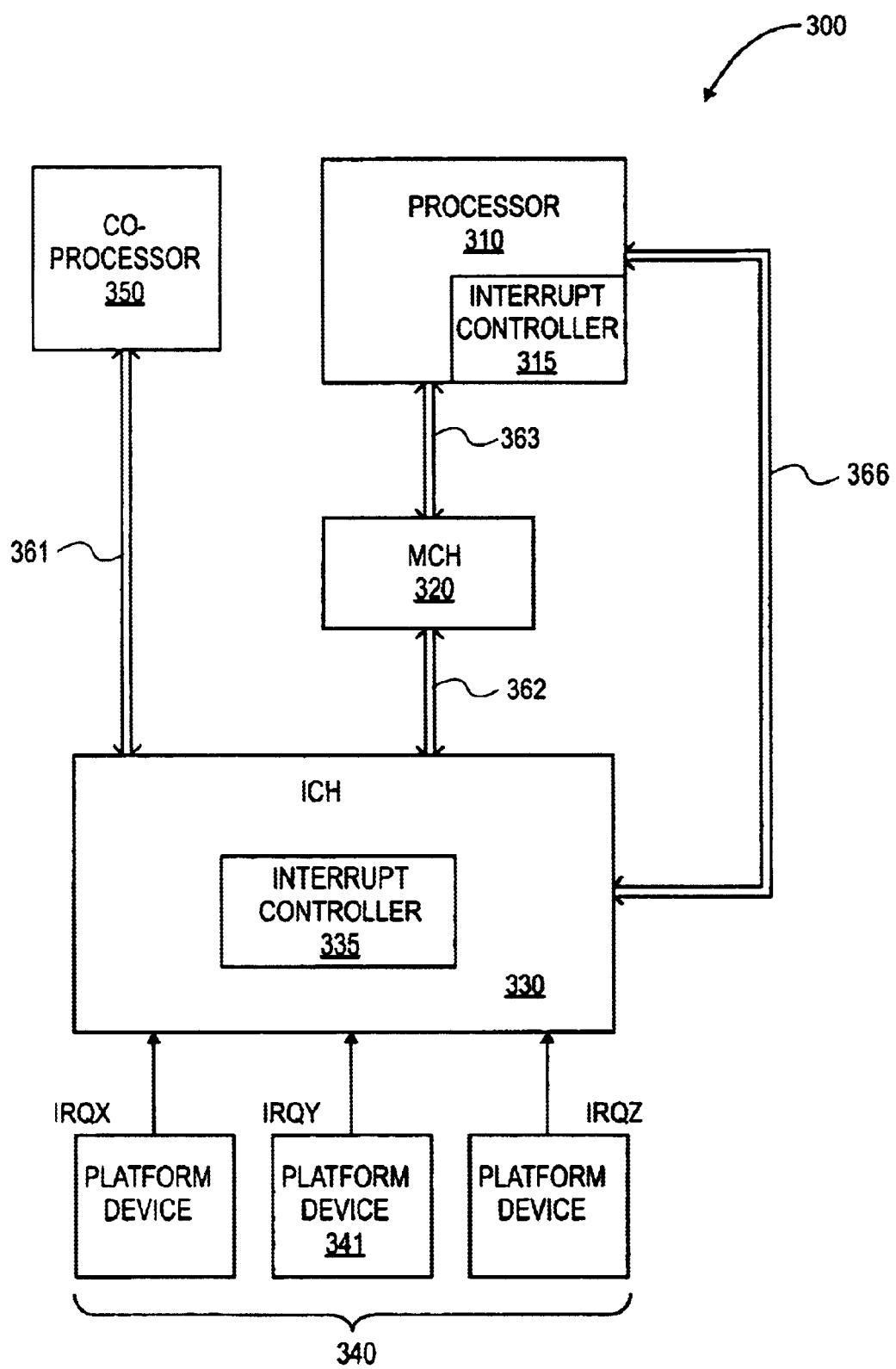
FIG. 3 illustrates an alternative of a computer system having multiple processors running independent operating systems.

FIG. 3 illustrates an alternative of a computer system having multiple processors running independent operating systems. The components of computer system 300 are similar to those of computer system 200 of FIG. 2 unless otherwise stated. In this embodiment, the interrupt controller 335 of ICH 330 may be an advanced programmable interrupt controller (APIC) such as the 82489DX from Intel Corporation of Santa Clara, Calif. An APIC may be used by operating systems such as the Microsoft Windows NT Operating System that allows more flexibility in interrupt handling. In an alternative embodiment, another APIC and operating system may be used.

ICH 330 is configured such that an interrupt message may be delivered on multiple buses (e.g., buses 361 and 366) that connect processors (e.g., processors 310 and 350) to ICH 330. When an interrupt is pending, platform device 341 sends an interrupt signal to APIC 335. In response, APIC 335 may issue an interrupt data packet to either processor 310 on bus 366 or processor 350 on bus 361. The use of bus 366 with APIC 335 enables not only the signaling of an interrupt, but also enables the identification of the particular platform device issuing the interrupt through the use of a data packet.

The targeted processor then uses the data packet to determine the address of the interrupt service routine. The targeted processor executes the interrupt service routine to process the interrupt.

ICH 330 is configured to recognize the that there may be a more than one possible master processor in computer system 300 and redirect an interrupt request to either processor 310 or co-processor 350 based on the mode of operation. In one embodiment, software may be used to program ICH 330 to know the current operating mode of computer system 300. In an alternative embodiment, ICH 330 may be hardwired to detect the mode of computer system 300 based on a signal state.

In yet another embodiment, interrupt controller 335 of ICH 330 may include both a PIC and an APIC with the APIC configured to issue interrupts to processors 310, 350 from either the PIC or directly from platform devices. In the embodiment where co-processor 350 is configured as a PCI device, interrupt controller 335 is configured to handle either PIC or PIC/APIC interrupts. A message signaled interrupt (MSI) mechanism may also be supported by ICH 330 which allows PCI devices to write to a register in ICH 330 as an equivalent of toggling an IRQ line.

Figure 6:
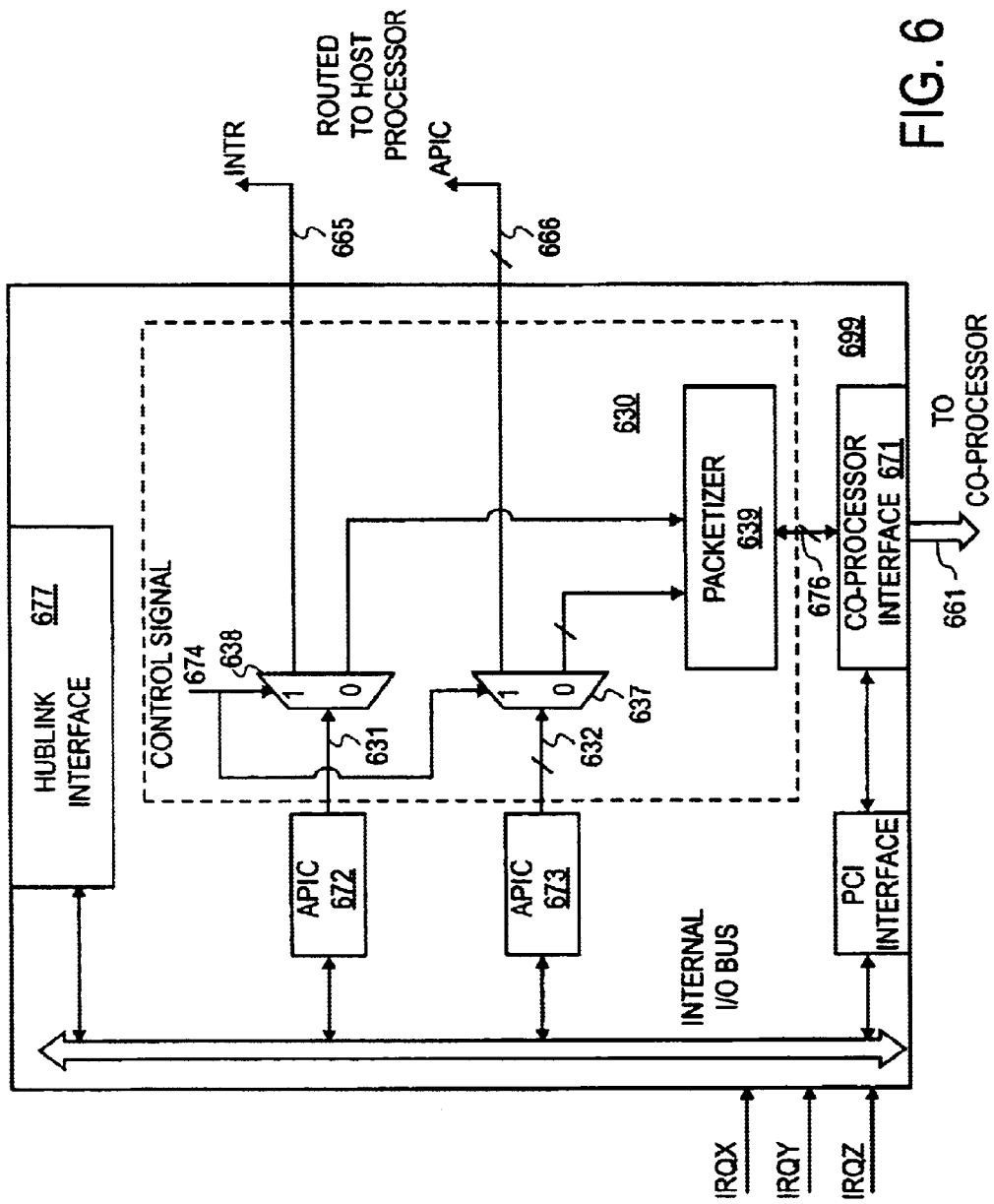
FIG. 6 illustrates one embodiment of control logic of a controller.

FIG. 6 illustrates one embodiment of control logic of a controller. Control logic 630 may be implemented within an ICH 699 that, for example, includes both a PIC 672 and an APIC 673. ICH 699 includes a hublink interface 677 and a co-processor interface 671 for communication with a MCH and co-processor, respectively. Control logic 630 includes switches 637 and 638, and packetizer 639.

Switch 638 is coupled to receive a signal from PIC 672 on line 631 and switch 637 is coupled to receive a signal from APIC 673 on bus 632. In one embodiment, if control signal 674 for switch 637 or 638 is high, interrupts are directed to a host processor on either line 665 or bus 666, corresponding to the use of PIC 672 and APIC 673, respectively. If the control signal 674 for switch 637 or switch 638 is low, interrupts are directed to a co-processor. Packetizer 639 converts either interrupt method into an interrupt message that the co-processor uses. Packetizer 639 is coupled to co-processor interface 671 with bus 676.

Figure 4:
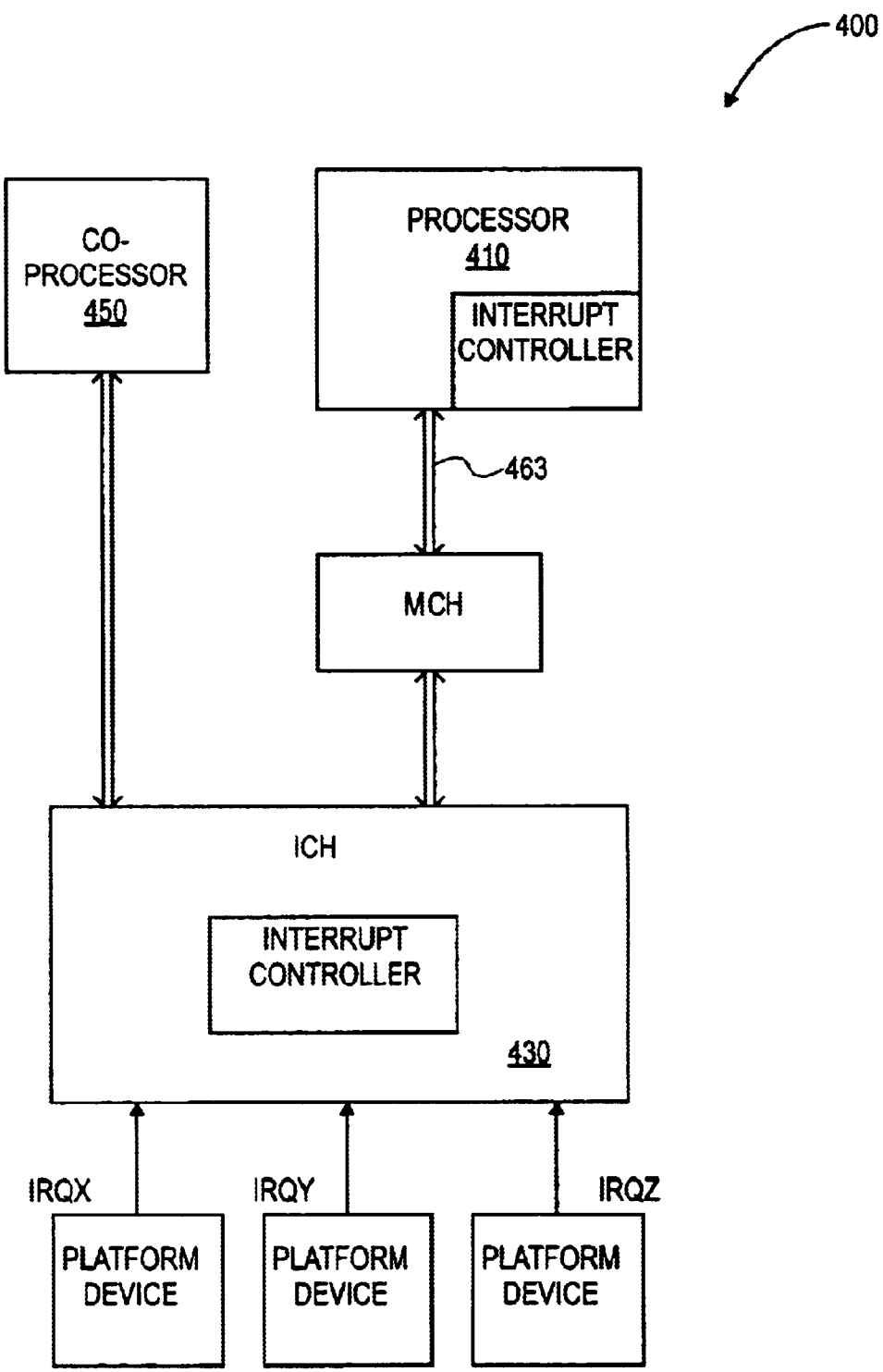
FIG. 4 illustrates another embodiment of a computer system having multiple processors running independent operating systems.

FIG. 4 illustrates another embodiment of a computer system having multiple processors running independent operating systems. The components of computer system 400 are similar to those of computer system 200 of FIG. 2, unless otherwise stated. In this embodiment, ICH 430 does not use a dedicated interrupt line or an APIC bus to communicate interrupts to processor 410. Rather, the interrupts are communicated to processor 410 via host bus 463. ICH 430 converts the IRQ into a memory write cycle and sends it upstream to host bus 463. Processor 410 snoops this address and accepts the interrupt.

The use of a separate bus for communication with a co-processor running a independent OS than a host processor is independent of the attachment point for the co-processor. Although FIGS. 2–4 illustrate a co-processor coupled to the ICH, in alternative embodiments, the co-processor may be coupled to other components of the computer system. For examples, the co-processor may be coupled to the MCH, directly to the host processor or integrated with the host processor.

In an alternative embodiment, computer system 200 may be other types of computer systems, for examples, a desktop or server system. Moreover, the co-processors of FIGS. 2–4 above may be replaced with a gateway configured to access computer system resources in a manner to minimize costs. The gateway is a device that provides wide area network (WAN) or Internet access to a local area network. In one embodiment, the gateway may include a network card that may operate with, for examples, ADSL, cable modems, wireless modems, and home networking hardware.

Figure 5:
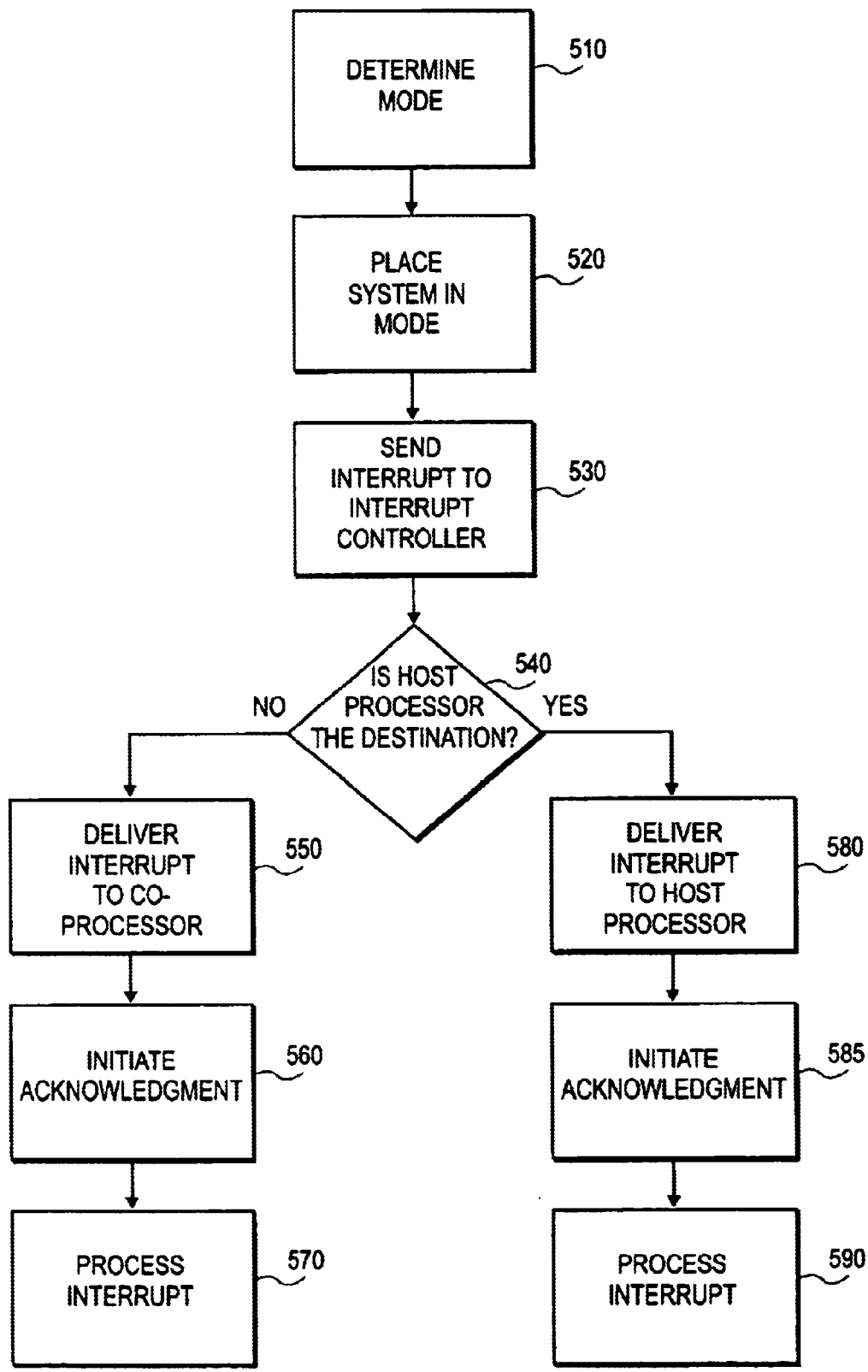
FIG. 5 is a flow chart illustrating one embodiment of an interrupt delivery method.

FIG. 5 is a flow chart illustrating one embodiment of a method of interrupt delivery. The method discussed in relation to FIG. 5 is for an implementation of a co-processor coupled to an ICH in a computer system. In alternative embodiments, the method may be altered for the implementation of a co-processor attached to other components in the system.

In one embodiment, an ICH of a computer system determines a mode of operation of the computer system having a host processor and a co-processor operating with independent operating systems, step 510. The modes of operation may include, for example, a Full ON mode, a Limited ON mode, and Listen mode. In the Full ON mode, the host processor and the co-processor are both on. In the Limited ON mode, the host processor is off and the co-processor is on. In Listen mode, the host processor is off and the co-processor is in a low power mode with the co-processor configured as a master device waiting for a trigger event. In an alternative embodiment, the host processor may be configured as the master device.

The ICH is then placed in the appropriate mode, step 520. For example, during the transition from the Full ON mode to the Limited ON mode, software may be used to configure the ICH into the appropriate mode.

When an interrupt is pending, a platform device coupled to the ICH sends an interrupt signal to an ICH interrupt controller, step 530. In response, the ICH interrupt controller delivers the interrupt to one of the host processor and the co-processor based on the computer system's current mode of operation, step 540. In an alternative embodiment, the ICH interrupt controller may determine the destination processor after an interrupt is received from a platform device.

If the computer system is in Limited ON mode (or Listen mode with the co-processor configured as the master device), the ICH interrupt controller delivers the interrupt request to the co-processor on a bus line different than that used to communicate with the host processor, step 550. When the main OS is running in the system, all resources including the ICH interrupt controller may be under the control of the host processor running the main OS. As such, having the ICH interrupt controller re-directing interrupts to a co-processor occurs when the main OS is in a sleep mode (i.e., not running).

In an alternative embodiment, if there is a need to have some platform devices interrupt the co-processor while both the co-processor and the host processor are running, the ICH may first deliver the interrupt to the host processor's interrupt controller. The interrupt controller of the host processor services the interrupt on its software stack and then may interrupt the co-processor as needed through messaging. In such an embodiment, the co-processor and the host processors include protocols between them to handle these mechanisms.

On receiving the interrupt request from the ICH interrupt controller, the co-processor initiates an acknowledgement command when it is ready, step 560. The co-processor then runs a routine to handle the interrupt pending on the requesting platform device, step 570.

In one embodiment, the interrupt acknowledgement command requests the identification of the platform device that sent the interrupt request. The ICH interrupt controller then sends an interrupt vector to the co-processor that identifies the requesting platform device. In an alternative embodiment, the interrupt request includes the identification of the platform device that sent the interrupt request. In yet another embodiment, the ICH may be configured to detect the mode of operation before receipt of an interrupt request.

If the host processor is determined to be the destination processor, then the ICH interrupt controller delivers the interrupt request to the host processor on a bus line different than that used to communicate with the co-processor, step 580. The host processor is the destination processor in Full ON mode and in standby mode where a capable co-processor is not present.

On receiving the interrupt request from the ICH interrupt controller, the host processor initiates an acknowledgement command when it is ready, step 585. The host processor then runs a routine to handle the interrupt pending on the requesting platform device, step 590.

The computer systems described above in relation to FIGS. 2–4 may be a battery-powered portable computer system, for example, a laptop, notebook style computer, or hand-held device. By using different buses to delivery interrupt requests to multiple processors based on the mode of operation of the computer system, independent operation of the multiple processors is possible. This allows the co-processor to access system resources even when the processor containing the main OS is shut-down. As such, maximization of battery life in the portable computer system may be possible while still enabling use of some of the computer's functionality in a very low power mode (e.g., even when the screen is closed).

In the foregoing specification, the invention has been described with reference to specific exemplary embodiments thereof. It will, however, be evident that various modifications and changes may be made thereto without departing from the broader spirit and scope of the invention as set forth in the following claims. The specification and drawings are, accordingly, to be regarded in an illustrative sense rather than a restrictive sense.

What is claimed is:

1. A computer system, comprising:
   a first processor to operate with a first operating system;
   a second processor to operate with a second operating system independent of the first operating system;
   an input/output control hub (ICH) coupled to the first processor and the second processor;
   a platform device coupled to the ICH to direct an interrupt request to the ICH, the ICH to receive the interrupt request and direct the interrupt request to one of the first processor and the second processor based on a determined mode of operation;
   a first communication link coupled between the ICH and the first processor; and
   a second communication link coupled between the ICH and the second processor, the second communication link being different than the first communication link.

2. The computer system of claim 1, wherein the ICH comprises a programmable interrupt controller.

3. The computer system of claim 2, further comprising a memory control hub MCH coupled to the first processor and the ICH by a bus.

4. The computer system of claim 3, wherein the interrupt request is direct to the host processor on the bus using a bus based interrupt delivery.

* * * * *